(12) United States Patent
Thompson (10) Patent No.: US 8,215,351 B2
(45) Date of Patent: Jul. 10, 2012

(54) SHEAR BAND (75) Inventor: Ronald Hobart Thompson, Greenville, SC (US)

(73) Assignee: Michelin Recherche et Technique, Granges-Paccot (CH)

( * ) Notice: Subject to any disclaimer, the term of this patent is extended or adjusted under 35 U.S.C. 154(b) by 561 days.

(21) Appl. No.: 12/301,883

(22) PCT Filed: Oct. 13, 2006

(86) PCT No.: PCT/US2006/040727
§ 371 (c)(1),
(2), (4) Date: Jan. 14, 2009

(87) PCT Pub. No.: WO2008/045098
PCT Pub. Date: Apr. 17, 2008

(65) Prior Publication Data
US 2010/0018621 A1    Jan. 28, 2010

(51) Int. Cl.
*B32B 7/02*    (2006.01)
*B60C 9/18*    (2006.01)
*B60C 7/10*    (2006.01)

(52) U.S. Cl. ....... 152/197; 152/152; 152/520; 428/36.8; 428/36.91

(58) Field of Classification Search ............... 152/152, 152/196–207, 516, 520; 428/36.8, 36.91
See application file for complete search history.

(56) References Cited

U.S. PATENT DOCUMENTS

| | | | |
|---|---|---|---|
| 1,440,974 A | 2/1923 | Dornburgh | |
| 2,388,421 A | 6/1942 | Kraft et al. | |
| 2,382,068 A | 8/1945 | Kovacs | |
| 3,842,885 A * | 10/1974 | Alban | 152/532 |
| 3,973,613 A | 8/1976 | Marzocchi | |
| 4,425,953 A | 1/1984 | Rohde et al. | |
| 4,459,167 A | 7/1984 | Markow et al. | |
| 4,600,651 A | 7/1986 | Aufdermarsh et al. | |
| 4,601,941 A | 7/1986 | Lutz et al. | |
| 4,698,278 A | 10/1987 | Prang | |
| 4,734,144 A | 3/1988 | Markow | |
| 4,774,142 A | 9/1988 | Schmidt et al. | |
| 4,788,088 A | 11/1988 | Kohl | |
| 4,794,966 A | 1/1989 | Markow | |

(Continued)

FOREIGN PATENT DOCUMENTS

BE    857 640    10/1978

(Continued)

OTHER PUBLICATIONS

Supplementary European Search Report for EP 06 82 6194, Dated Mar. 4, 2011.

(Continued)

*Primary Examiner* — Justin Fischer
*Assistant Examiner* — Robert Dye
(74) *Attorney, Agent, or Firm* — Dority & Manning, P.A.

(57) ABSTRACT

An improved shear band for use in non-pneumatic tires, pneumatic tires, and other technologies is provided. The shear band is constructed as a composite of layers that are combined in a specific manner. Each layer is constructed from one or more materials having certain selected physical properties. The layers are combined a specific manner to create a composite having physical properties and performance characteristics desirably outperforming that of the individual materials forming the layers. When used in tire construction, improvements in rolling resistance can also be obtained.

30 Claims, 9 Drawing Sheets

U.S. PATENT DOCUMENTS

| | | | |
|---|---|---|---|
| 5,004,031 A | 4/1991 | Kadota et al. | |
| 5,096,772 A | 3/1992 | Snyder | |
| 5,503,940 A | 4/1996 | Majumdar et al. | |
| 5,565,257 A | 10/1996 | Tingley | |
| 5,762,740 A | 6/1998 | Benzing, II et al. | |
| 5,804,002 A | 9/1998 | Nakano | |
| 5,837,077 A | 11/1998 | Kabe et al. | |
| 6,109,319 A | 8/2000 | Gardetto | |
| 6,109,322 A | 8/2000 | Benzing, II et al. | |
| 6,422,279 B1 | 7/2002 | Williams et al. | |
| 6,460,586 B1 * | 10/2002 | Spragg et al. | 152/516 |
| 6,470,937 B1 | 10/2002 | Spragg et al. | |
| 6,598,634 B1 | 7/2003 | Koch et al. | |
| 6,598,645 B1 | 7/2003 | Larson | |
| 6,701,987 B1 * | 3/2004 | Abbott | 152/516 |
| 6,759,136 B2 | 7/2004 | Kanenari et al. | |
| 6,769,465 B2 | 8/2004 | Rhyne et al. | |
| 6,792,986 B2 | 9/2004 | Allen et al. | |
| 6,843,293 B1 * | 1/2005 | Corvasce et al. | 152/516 |
| 6,983,776 B2 | 1/2006 | Thompson et al. | |
| 6,994,134 B2 | 2/2006 | Grah | |
| 7,363,805 B2 | 4/2008 | Jayakumar et al. | |
| 7,418,988 B2 | 9/2008 | Cron et al. | |
| 2001/0023729 A1 * | 9/2001 | Sandstrom et al. | 152/517 |
| 2004/0159385 A1 | 8/2004 | Rhyne et al. | |
| 2004/0187996 A1 * | 9/2004 | Grah | 152/516 |
| 2007/0267116 A1 | 11/2007 | Rhyne et al. | |
| 2008/0250843 A1 | 10/2008 | Albohr et al. | |

FOREIGN PATENT DOCUMENTS

| | | |
|---|---|---|
| DE | 29 34 524 A1 | 3/1981 |
| EP | 400859 A2 | 12/1990 |
| EP | 0 327 173 B1 | 4/1992 |
| EP | 853009 A2 | 7/1998 |
| EP | 0974449 A2 | 1/2000 |
| EP | 1 491 328 A1 | 12/2004 |
| EP | 1 504 892 A1 | 2/2005 |
| EP | 1980420 A1 | 10/2008 |
| FR | 455 938 | 3/1913 |
| FR | 742 981 | 9/1932 |
| FR | 2 425 334 | 7/1979 |
| JP | 02-310107 A | 12/1990 |
| JP | 02-310108 A | 12/1990 |
| JP | 02-310109 A | 12/1990 |
| JP | 04043103 | 2/1992 |
| JP | 08132824 | 5/1996 |
| JP | 2002-2222 | 1/2002 |
| WO | 94/11185 A1 | 5/1994 |
| WO | 98/23456 A1 | 6/1998 |
| WO | 02/43974 A1 | 6/2002 |
| WO | 03/037661 A1 | 5/2003 |
| WO | 2004/041219 A1 | 5/2004 |
| WO | 2008/102048 A1 | 8/2008 |
| WO | 2009/005946 A1 | 1/2009 |

OTHER PUBLICATIONS

PCT International Search Report for PCT/US2006/40727, Dated Apr. 30, 2007.

* cited by examiner

FIG. 9

SHEAR BAND

RELATED APPLICATIONS

The present application is a U.S. national phase filing of PCT/US2006/040727 filed on Oct. 13, 2006.

TECHNICAL FIELD OF THE INVENTION

The present invention provides an improved shear band for use in non-pneumatic tires, pneumatic tires, and other technologies. The improved shear band is uniquely constructed as a composite of individual layers. The individual layers are selected from certain materials having specific physical properties that, when combined in a particular manner as described herein, provide overall physical properties and performance characteristics exceeding that of a shear band constructed from only one of the individual materials. When used in tire construction, improvements in rolling resistance can also be obtained.

BACKGROUND OF THE INVENTION

Tires utilizing a unique annular band have been disclosed. For example, U.S. Pat. No. 6,769,465, relates to a structurally supported resilient tire that supports a load without internal air pressure. In an exemplary embodiment, this non-pneumatic tire includes a ground contacting portion and side wall portions that extend radially inward from the tread portion and anchor in bead portions that are adapted to remain secure to a wheel during rolling of the tire. A reinforced annular band is disposed radially inward of the tread portion. This shear band includes at least one shear layer, a first membrane adhered to the radially inward extent of the shear layer and a second membrane adhered to the radially outward extent of the shear layer. Each of the membranes has a longitudinal tensile modulus sufficiently greater than the dynamic shear modulus of the shear layer so that, when under load, the ground contacting portion of the tire deforms to a flat contact region through shear strain in the shear layer while maintaining constant length of the membranes. Relative displacement of the membranes occurs substantially by shear strain in the shear layer. The invention of U.S. Pat. No. 6,769,465 provides several advantages including, for example, the ability to operate without an inflation pressure and the flexibility to adjust the vertical stiffness of the tire somewhat independently of the ground contact pressure.

By way of further example, U.S. Patent Application Publication No. 2004/0159385, also relates to a non-pneumatic tire. In an exemplary embodiment, this non-pneumatic tire includes an outer annular shear band and a plurality of web spokes that extend transversely across and radially inward from the annular band and are anchored in a wheel or hub. In certain exemplary embodiments, the annular shear band may further comprise a shear layer, at least a first membrane adhered to the radially inward extent of the shear layer and at least a second membrane adhered to the radially outward extent of the shear layer. Under load, the annular band deforms in the contact area with the ground surface through a mechanism that includes shear deformation of the annular band. In addition to the ability to operate without a required inflation pressure, the invention of Publication No. 2004/0159385 provides advantages that include a more uniform ground contact pressure throughout the length of the contact area, which in turn provides performance characteristics similar to a pneumatic tire without certain drawbacks of prior non-pneumatic tires.

As described for the exemplary embodiments of the references discussed above, both used an annular shear band comprising a shear layer to provide desirable performance benefits in a tire. As described below, Applicants have discovered an advantageous construction for the shear layer that even further enhances the performance capabilities of the annular band. This improved construction for the shear layer has application in pneumatic tires, nonpneumatic tires, and other products as well. In addition, such advantages can be obtained, if so desired, without the use of additional reinforcing elements within the shear layer.

THE SUMMARY OF THE INVENTION

Objects and advantages of the invention will be set forth in part in the following description, or may be obvious from the description, or may be learned through practice of the invention.

In one exemplary embodiment of the present invention, a shear band is provided that defines a radial direction. The shear band comprises a composite shear layer having an overall dynamic shear modulus. The composite shear layer comprises at least (i) one or more layers having a first dynamic shear modulus and a first total volume fraction, and (ii) one or more layers having a second dynamic shear modulus and a second total volume fraction. The ratio of the second dynamic shear modulus to the first dynamic shear modulus is at least about 3. The layers of the composite shear band are arranged in an alternating manner between layers having the first dynamic shear modulus and layers having the second dynamic shear modulus. At least a first membrane is adhered to a radially inward extent of the composite shear layer. At least a second membrane is adhered to a radially outward extent of the composite shear layer. The ratio of the longitudinal tensile modulus of one of the membranes to the overall dynamic shear modulus of the composite shear layer is at least about 100:1. For this exemplary embodiment, the layer(s) having a first dynamic shear modulus may comprise at least one material having a hysteresis of less than about 0.2 at strains between about 15 percent and about 30 percent. Alternatively, the layers having a first dynamic shear modulus may comprises at least one material having a hysteresis of less than about 0.1 at strains between about 15 percent and about 30 percent. Further still for this exemplary embodiment, the layer(s) having a second dynamic shear modulus may comprise at least one material having a hysteresis of less than about 0.07 at strains between about 0.1 percent and about 2 percent. Alternatively, the layer(s) having a second dynamic shear modulus may comprise at least one material having a hysteresis of less than about 0.04 at strains between about 0.1 percent and about 2 percent. By way of example only, these exemplary embodiments of a shear band may be incorporated into tires, each having a ground contacting portion and a tread portion.

In another exemplary embodiment of the present invention, a tire for placement on a wheel is provided with the tire defining a radial direction. The tire comprises a ground contacting tread portion. A reinforced annular band is also included and is disposed radially inward of the tread portion. The reinforced annular band comprises a composite shear layer having an overall dynamic shear modulus. The composite shear layer comprises (i) one or more layers constructed from materials having a first dynamic shear modulus and a first total volume fraction, and (ii) one or more layers constructed from materials having a second dynamic shear modulus and a second total volume fraction. The ratio of the second dynamic shear modulus to the first dynamic shear modulus is at least about 3. The layers of materials having either the first or second dynamic shear modulus are arranged in an alternating manner between the first dynamic shear modulus and the second dynamic shear modulus along the radial direction of the tire. A support structure is provided for mounting the band and the tread portion to the wheel. The support structure is located radially inward of the reinforced annular band. At least a first membrane is adhered to the radially inward extent of the composite shear layer. At least a second membrane is adhered to the radially outward extent of the composite shear layer. The ratio of the longitudinal tensile modulus of one of the membranes to the overall dynamic shear modulus of the composite shear layer is at least about 100:1.

In still another exemplary embodiment of the present invention, a tire for placing on a wheel is provided. The tire has a ground contacting tread portion and a reinforced annular band disposed radially inward of the tread portion. The band comprises a composite shear layer having an overall dynamic shear modulus. The composite shear layer comprises i) a first shear layer having a first dynamic shear modulus, and ii) a second shear layer disposed radially outward of the first shear layer. The second shear layer has a second dynamic shear modulus. The ratio of the second dynamic shear modulus to the first dynamic shear modulus is at least about 3. Means for connecting the tread portion and the annular band with the wheel are also provided. At least a first membrane is adhered to the radially inward extent of the composite shear layer. At least a second membrane is adhered to the radially outward extent of the composite shear layer. The ratio of the longitudinal tensile modulus of one of the membranes to the overall dynamic shear modulus of the composite shear layer is at least about 100:1.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

Repeat use of identical or similar reference characters throughout the present specification and appended drawings is intended to represent same or analogous features or elements of the invention.

DETAILED DESCRIPTION OF REPRESENTATIVE EMBODIMENTS

Definitions

Reference will now be made in detail to embodiments of the invention, one or more examples of which are illustrated in the figures. Each example is provided by way of explanation of the invention, and not meant as a limitation of the invention. For example, features illustrated or described as part of one embodiment can be used with another embodiment to yield still a third embodiment. It is intended that the present invention include these and other modifications and variations. It should be noted that for the purposes of discussion, only half of the exemplary tire embodiments may be depicted in one or more of the figures. One of ordinary skill in the art, using the teachings disclosed herein, will understand that the same or substantially similar features are repeated on both sides of the tire.

The following terms are defined as follows for this disclosure:

"Composite", as used herein, means constructed from two or more layers.

"Dynamic Shear Modulus" means the shear modulus measured per ASTM D5992.

"Elongation at Break" means the tensile elongation as measured by ASTM D412-98a and conducted at 100° C. rather than ambient.

"Equatorial Plane" means a plane perpendicular to the axis of rotation of the tire passing through the centerline of the tire.

"Hysteresis" means the dynamic loss tangent (max tan δ). The dynamic characteristics of the materials are measured on an MTS 831 Elastomer Test System in accordance with ASTM D5992. The response of a sample of vulcanized material (cylindrical test piece of a thickness of 4 mm and a section of 400 mm$^2$), subjected to an alternating single sinusoidal shearing stress, at a frequency of 10 Hz and at 80° C., is recorded. Scanning is effected at an amplitude of deformation of 0.1 to 50% (outward cycle), then of 50% to 0.1% (return cycle). The maximum shear modulus G* max in MPa and the maximum value of the tangent of the loss angle tan delta (max tan δ) is determined during the outward cycle.

"Meridian Plane" means a plane parallel to the axis of rotation of the tire and extending radially outward from the axis.

"Modulus" of the membranes means the tensile modulus of elasticity at 1% elongation in the circumferential direction multiplied by the effective thickness of the membrane. This modulus can be calculated by Equations 6 or 7, below, for conventional tire steel belt materials. This modulus is noted with a prime (') designation.

"Wheel" or "Hub" refer to any device or structure for supporting the tire and mounting to the vehicle axle, and such terms are interchangeable herein.

DETAILED DESCRIPTION

The present invention provides an improved shear band that may be used in a variety of products including, for example, non-pneumatic tires, pneumatic tires, and other technologies. The improved shear band is constructed as a composite comprised of individual layers, which are in turn constructed from certain materials having specific physical properties that, when combined in a particular manner as described herein, provide overall physical properties and performance characteristics desirably exceeding that which would be obtained from a shear band constructed from only one of the individual materials. By way of example only, in certain embodiments that may be used for tire construction, improvements in rolling resistance and tire design flexibility can be obtained.

Figure 1A:
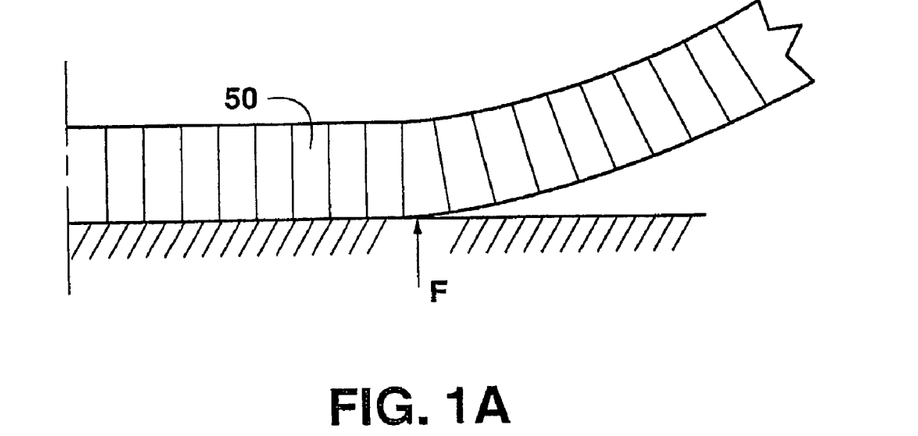
FIG. 1A is a schematic diagram illustrating the ground reaction forces for a reference homogeneous band.
Figure 1B:
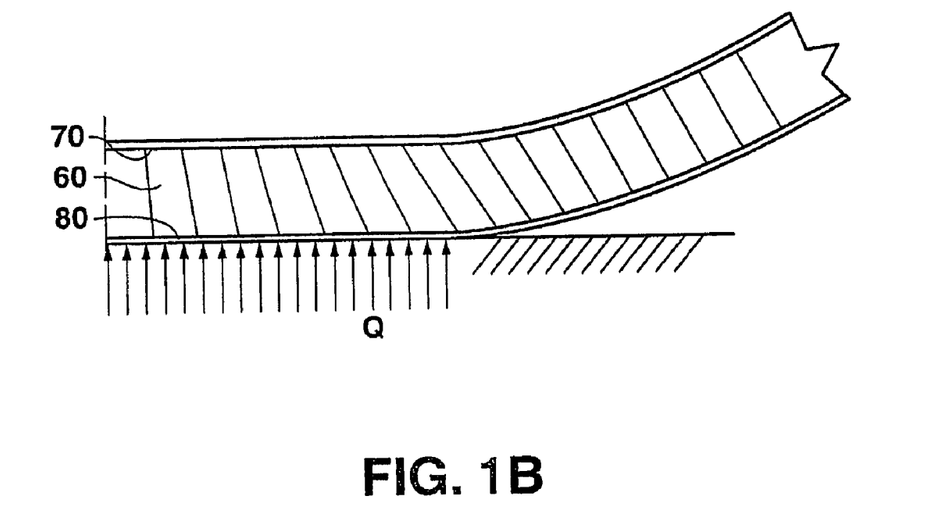
FIG. 1B is a schematic diagram illustrating the ground reaction forces for an annular band having a shear layer.

By way of background to the present invention, the usefulness of a shear band constructed from only a single material, single shear layer may be described with reference to FIGS. 1A and 1B. FIG. 1A illustrates a rigid annular band 50 comprised of a homogeneous material, for example, a metallic ring, that does not allow for more than insignificant shear deformation under load. In the rigid annular band 50 of FIG. 1A, the pressure distribution satisfying the equilibrium force and bending moment requirements is made up of a pair of concentrated forces F located at each end of the contact area, one end of which is shown in FIG. 1A. By contrast, FIG. 1B illustrates a shear band having a single shear layer 60, inner reinforcement or membrane 70, and outer reinforcement or membrane 80. The structure of FIG. 1B, having a band constructed as described for example in U.S. Pat. No. 6,769,465, prescribes shear deformation within the shear layer 60, resulting in a desirable pressure distribution Q in the ground contact region that is substantially uniform. More specifically, when the ratio of the effective tensile modulus of the membranes ($E'_{MEMBRANE}$) 70 and 80 to the dynamic shear modulus G of the shear layer 60 is sufficiently high (for example, at least about 100 to 1) deformation of the shear band under load is essentially by shear deformation of the shear layer 60 with little longitudinal extension or compression of the membranes 70 and 80, which results in a substantially uniform ground contact pressure distribution Q.

When the shear band of FIG. 1B deforms substantially by shear deformation in shear layer 60, an advantageous relation is created allowing one to specify the values of the dynamic shear modulus G of layer 60 and its thickness h for a given application:

$$P_{eff} * R = G * h \quad (1)$$

Where:
 $P_{eff}$=predetermined ground contact pressure
 G=dynamic shear modulus of layer 60
 h=thickness of shear layer 60
 R=radial position of the outer membrane 80

$P_{eff}$ and R are design parameters chosen according to the intended use of the tire. The above equation then suggests that the product of the dynamic shear modulus G of the shear layer times the radial thickness of shear layer 60 is approximately equal to a product of a predetermined ground contact pressure times a radial position of the outermost extent of the outer membrane 80. The above relation is advantageous to one designing a tire. For example, to design a tire intended for passenger car use, the designer may select a design contact pressure $P_{eff}$ of 1.5 to 2.5 DaN/cm$^2$ and a tire size in which the radius R is about 335 mm. By multiplying these values, a "shear layer factor" of 50.25 to 83.75 DaN/cm may be determined, which can be used to specify the thickness h of shear layer 60 and the dynamic shear modulus G of shear layer 60.

However, as indicated previously, challenges are encountered in manufacturing a tire having both a low rolling resistance and a single material shear layer that exhibits all of the desired physical properties. By way of explanation, it is known that rolling resistance is proportional to certain physical parameters as follows:

$$RR \sim (\tau_{max})(\gamma_{max})(\text{TAN } \delta)(h) \quad (2)$$

Where:
 RR=rolling resistance
 $\tau_{max}$=shear stress at maximum shear angle
 $\gamma_{max}$=maximum shear angle
 tan δ=hysteresis, phase lag between stress and strain for the shear layer material
 h=thickness of a single shear layer Selecting materials for construction of a shear band from a single shear layer in a manner that minimizes rolling resistance while also providing a dynamic shear modulus for the shear layer in the desired range of about 3 to about 20 MPa has previously required a compromise among competing desirable physical properties. More specifically, it is difficult to construct a shear layer made from a single material that is simultaneously stiff (high dynamic shear modulus G), tough (having a high elongation at break), and of low hysteresis (low tan δ). Less difficulty is presented in manufacturing a material that has any two of these three properties. For example, materials can be engineered that exhibit stiffness (high dynamic shear modulus G) and low hysteresis (low tan δ), but such construction will typically result in a lower $\gamma_{max}$. While a lower rolling resistance RR can be obtained, endurance will be poor unless a shear layer construction having a larger thickness h is constructed to reduce shear strains δ. However, increasing the thickness h of the shear layer undesirably increases the mass of the tire. Similarly, selecting materials that provide a shear layer that is tough and has a low hysteresis will unfortunately also provide an unacceptably low dynamic shear modulus G. Again, the thickness h of the shear layer will be increased to achieve an acceptable $P_{eff}$. Finally, selecting materials that are both stiff and tough will provide a shear layer having an undesirably high hysteresis.

Applicants have determined that a shear layer that has a desirable $P_{eff}$, a lower thickness h, and a lower rolling resistance RR can be achieved by constructing the shear layer 60 as a composite of different layers made from materials that each have certain individual physical properties. More specifically, a shear band having the overall desired physical properties can be engineered to overcome the drawbacks of the individual materials by constructing the shear layer in a particular manner as a composite of specially selected materials. The physical properties of the composite of individual materials can exhibit the desired physical properties and an improvement in rolling resistance at desired thickness of h that is not possible with only a single shear layer constructed of a single, individual material. In addition, if desired, the composite of shear layers can be constructed from such materials without having to use non-elastomeric reinforcement components. Alternatively, exemplary embodiments of the present invention may include such reinforcement components as well.

Figure 2:
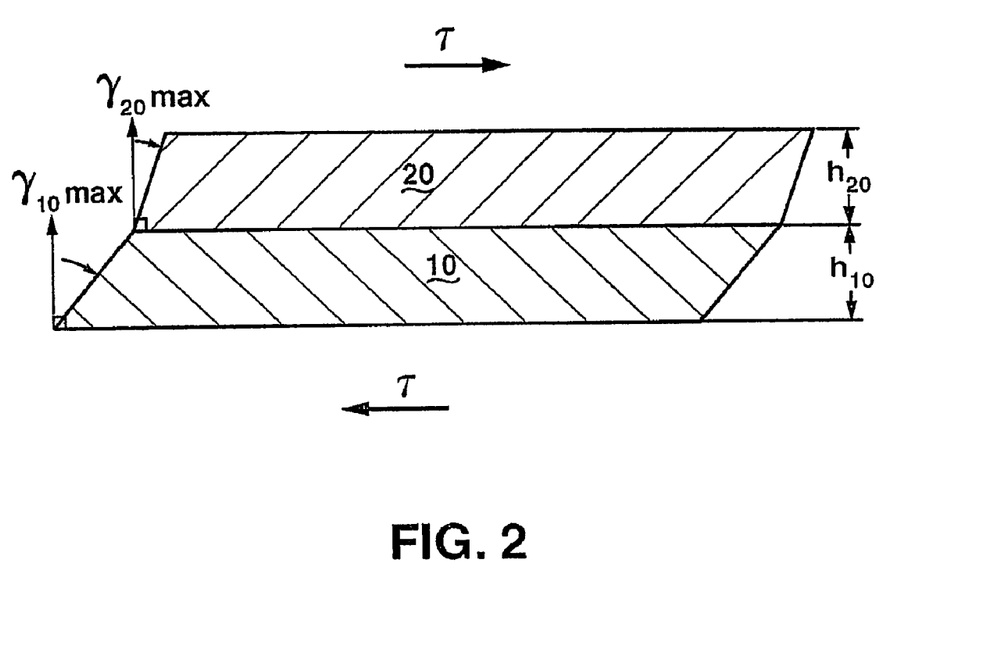
FIGS. 2, 3, and 4 are cross section views of composites of shear layers for shear bands constructed according to exemplary embodiments of the present invention.

By way of example, referring now to FIG. 2, a shear band according to one exemplary embodiment of the present invention is shown as being constructed from two different shear layers 10 and 20. Layer 10 has a dynamic shear modulus $G_{10}$ and layer 20 has a dynamic shear modulus of $G_{20}$. In FIG. 2, for purposes of discussion, shear layers 10 and 20 are depicted under shear stress τ resulting in a certain strain for each of the layers. As shown in FIG. 2, each layer 10 and 20 is depicted as experiencing a maximum shear strain resulting in maximum shear angles of $\gamma_{10max}$ and $\gamma_{20max}$ respectively. Applicants have determined that a shear band constructed from the combined shear layers 10 and 20 can be engineered, through a unique combination and selection of materials, to exhibit a lower rolling resistance RR and more advantageous physical properties than a non-composite, single layer shear band.

As determined by applicants, relative to layer 20, layer 10 is constructed from a softer material with a relatively lower dynamic shear modulus $G_{10}$ that will exhibit low hysteresis even though this material is operating at relatively higher strain than layer 20 for a given shear stress $\tau$. For example, preferably the material for layer 10 should have an Elongation at Break at 100° C. (determined by ASTM D412 tested at 100° C.) of greater than about 100 percent and, alternatively, greater than about 180 percent. Furthermore, the dynamic shear modulus (determined by ASTM D5992) should be between about 1.5 MPa and 5.0 MPa and, alternatively, between about 2.0 MPa and 4.0 MPa. On the other hand, relative to layer 10, layer 20 is constructed from a stiffer material with a relatively higher dynamic shear modulus $G_{20}$ that will exhibit low hysteresis as this material is operating in the low strain region for the ranges of shear stress $\tau$ that will be encountered. The material for layer 20 should have a dynamic shear modulus $G_{20}$ that is about 3 times greater than dynamic shear modulus $G_{10}$ and more desirably about 6 times greater than dynamic shear modulus $G_{10}$. Formed together as the shear band, the two layers 10 and 20 will exhibit overall physical properties of stiffness, toughness, and low hysteresis not present in either layer individually. Where used in a tire construction, the resulting shear band can also exhibit an acceptable level of rolling resistance without the necessity of increasing the total thickness h of the combined shear layers 10 and 20 undesirably.

Furthermore, a tire designer can also still obtain an overall dynamic shear modulus $G_{\textit{eff}}$ for the resulting shear band that is in the desired range (3 MPa to 20 MPa) for tire manufactured as discussed above. The overall dynamic shear modulus $G_{\textit{eff}}$ for the composite shear beam constructed of layers 10 and 20 can be calculated as follows:

$$G_{\textit{eff}} = 1/((Vf_{10}/G_{10}) + Vf_{20}/G_{20})) \quad (3)$$

Where:
  $G_{\textit{eff}}$=effective dynamic shear modulus of the composite shear layer (the modulus of a homogeneous layer necessary to achieve the same shear stiffness as the composite shear layer)
  $Vf_{10}$=volume fraction of soft material
  $G_{10}$=dynamic shear modulus of the softer shear layer material, as measured by ASTM D5992
  $Vf_{20}$=volume fraction of stiffer material
  $G_{20}$ dynamic shear modulus of the stiffer shear layer material, as measured by ASTM D5992
Volume fractions can be calculated as follows:

$$Vf_{10} = h_{10}/h$$

$$Vf_{20} = h_{20}/h$$

Where:
  $h_{10}$=height or thickness of layer 10
  $h_{20}$=height or thickness of layer 20
  h=overall thickness of all layers—i.e. $h_{10} + h_{20}$
It should be noted that the volume fraction equation given above is suitable for use when h is small compared to the radius of the tire. In other applications, e.g., for small diameter tires such as casters, geometric relationships known to those having ordinary skill in the art should be substituted for the above equations.

By way of example, assume that a designer selects a radius R of 300 mm and has two materials from which to select for the construction of the shear band. Assume that the materials have a dynamic shear modulus of 30 MPa and 3 MPa respectively. Previously, for the construction of the shear layer, the designer would select a single material for the shear band having a dynamic shear modulus that resulted in an acceptable thickness h for the shear layer as can be calculated using equation (1). However, as previously described, the selection of any single material for the shear layer necessarily involves a compromise in desired physical properties and may not optimize rolling resistance RR. Selection of the relatively hard material (30 MPa) would lower the thickness h of the shear band but would also reduce its endurance. Selection of a softer material (3 MPa) would improve endurance but at the expense of an increased thickness h.

However, a composite shear band with layers 10 and 20 can be constructed from both the high dynamic modulus and low dynamic modulus materials to achieve a $G_{\textit{eff}}$ that is within the desired range. Assume layer 20 is constructed from the material having the dynamic shear modulus of 30 MPa and layer 10 is constructed the material having a dynamic shear modulus of 3 MPa. In the case where the layers are constructed of an equal volume, using equation (3) above the effective dynamic shear modulus $G_{\textit{eff}}$ would be about 6 MPa. Using equation (1) above and selecting a shear band thickness of 10 mm, the resulting $P_{\textit{eff}}$ would be 3 bar—well within the range considered for tire design.

In addition, by selecting a material for layer 10 that exhibits a low hysteresis at high strain and selecting a material for layer 20 having a low hysteresis at low strain, the composite will exhibit an acceptable rolling resistance RR. By way of example, at strains between 15 percent and 30 percent, the material for layer 10 may be selected from materials having a hysteresis of less than about 0.2 or, even more preferably, less than about 0.1. By way of example, at strains of between about 0.1 percent and 2 percent, the material for layer 20 may be selected from materials having a hysteresis of less than about 0.07 or, even more preferably, less than about 0.04.

Preferably, the thickness of layer 20 should not exceed 2 percent of the outer radius of the shear band. Such a construction limits the strain due to bending to less than about 1 percent. Returning to the example of a tire size having a radius of 300 mm, layer 20 may have a thickness of less than about 15 mm and, alternatively, has a thickness of less than about 6 mm.

The present invention is not limited to only two layers 10 and 20 for a composite shear band as shown in FIG. 2. Instead, the shear band may be constructed from multiple alternating layers of materials having a dynamic shear modulus of either $G_{10}$ or $G_{20}$. This may be desirable, for example, where a designer selects a radius R that is less than 300 mm, such as 150 mm. Returning to the example above, this will result in a $P_{\textit{eff}}$ of 6 bar where the designer has two materials with a $G_{\textit{eff}}$ of about 6 MPa. In such case, multiple layers for the shear band are necessary such that the thickness of the layers constructed from the higher dynamic modulus material $G_{20}$ preferably does not exceed 2 percent of the outer radius of the shear band.

Figure 3:
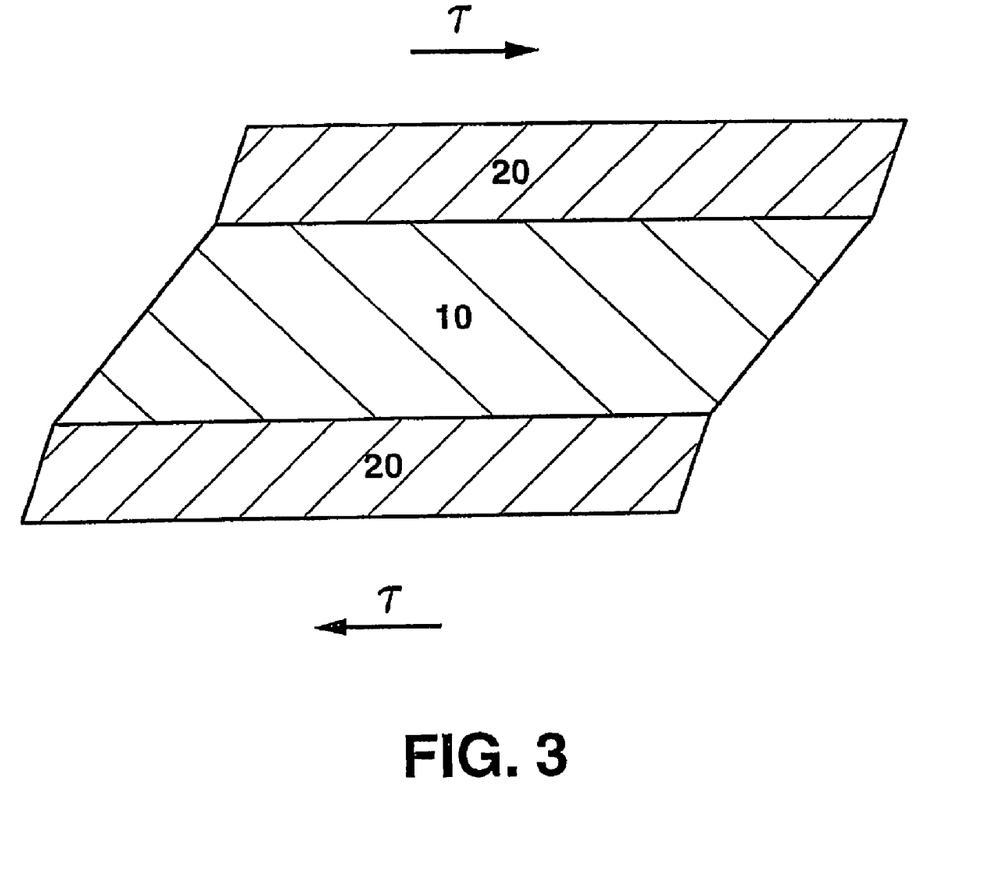
Figure 4:
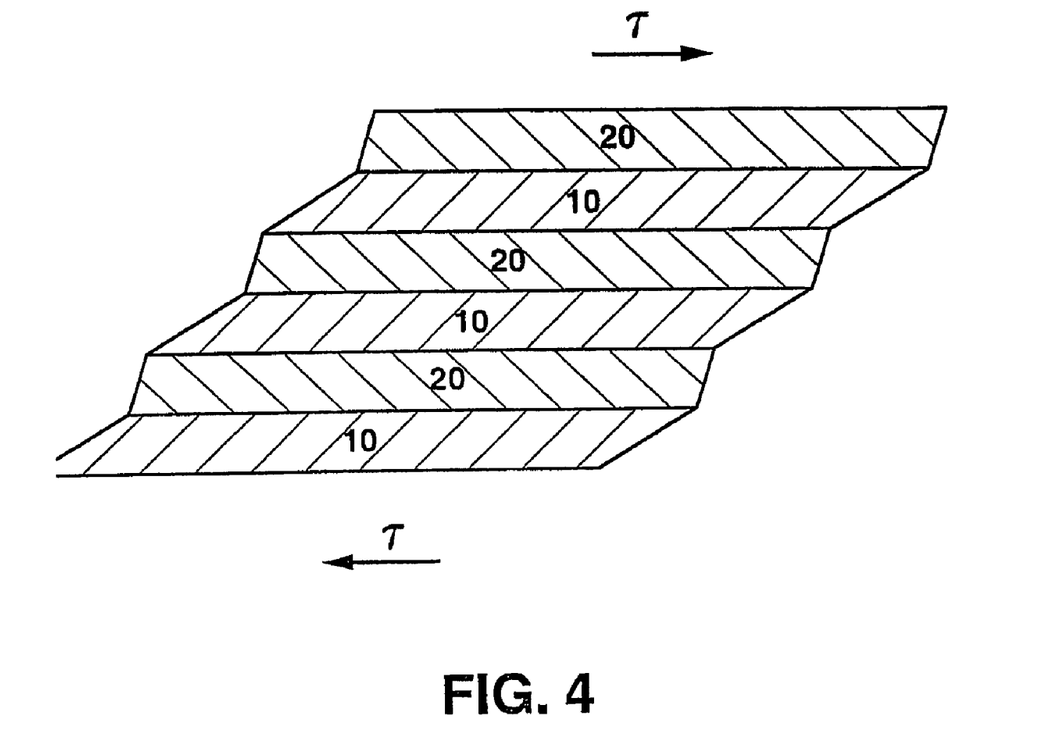

Accordingly, FIG. 3 illustrates another exemplary embodiment of the present invention in which the volume fraction of $G_{10}$ and $G_{20}$ are still equal (0.5). However, the shear band is shown as being constructed from three layers. Two layers 20 having a relatively higher dynamic shear modulus $G_{20}$ are positioned radially inward and radially outward of the relatively softer layer 10 having a lower dynamic shear modulus $G_{10}$. FIG. 4 illustrates yet another exemplary embodiment where multiple alternating layers 10 and 20 of selected materials, each having a dynamic shear modulus of $G_{10}$ or $G_{20}$ are used for the shear band. By way of further example, combinations of the embodiments of FIGS. 3 and 4 may also be used. One of skill in the art, using the teachings disclosed herein, will understand that numerous embodiments of the present invention may be created that fall within present disclosure and claims that follow.

Figure 5:
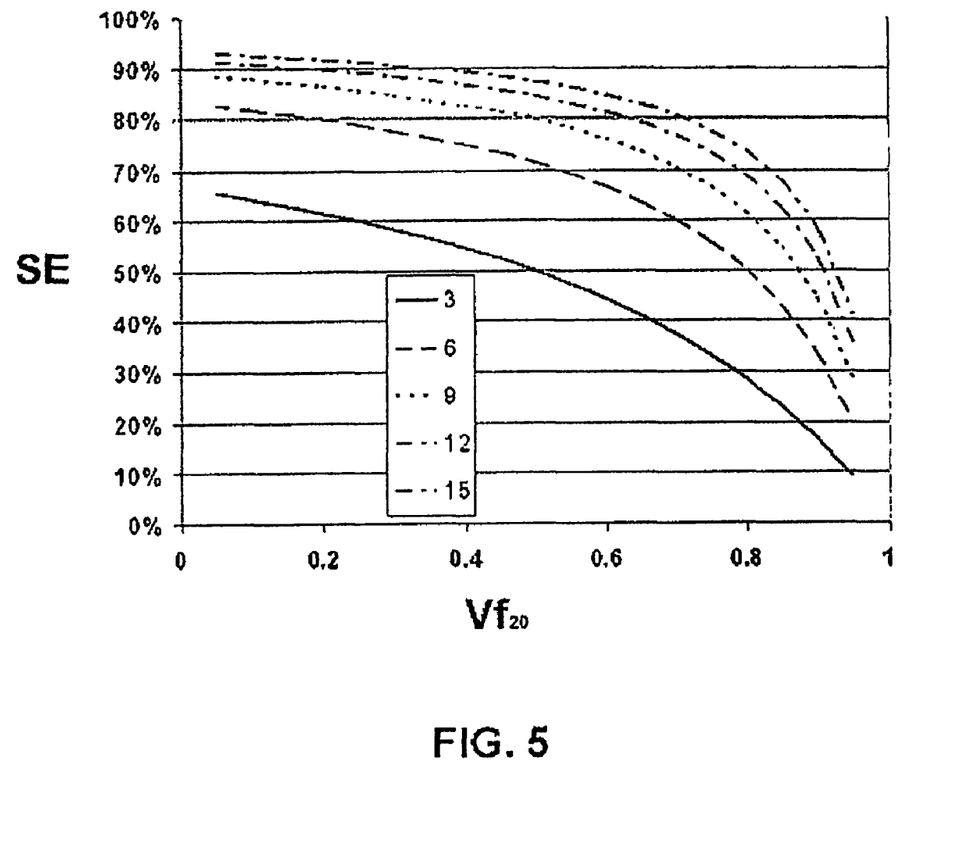
FIGS. 5 and 6 are plots of certain data as will be described below.

FIG. 5 provides a plot of Stiffness Efficiency (SE) versus the volume fraction $Vf_{20}$ for layer 20, the relatively stiffer layer, for various ratios of dynamic modulus of stiffer shear layer material $G_{20}$ to the softer shear layer material $G_{10}$. Applicants have defined Stiffness Efficiency (SE) as the actual increase in shear stiffness divided by the ideal increase in shear stiffness (i.e. the increase in shear stiffness if no shear strain occurred in the stiffer material). As shown in FIG. 5, the Stiffness Efficiency (SE) decreases as the volume fraction of the stiffer material $Vf_{20}$ increases. At a volume fraction $Vf_{20}$ of 0.50 the ratio of $G_{20}$ to $G_{10}$ must be at least 3.0 to obtain a 50 percent efficiency. A ratio $G_{20}$ to $G_{10}$ of 6.0 gives a stiffness efficiency of about 75 percent.

A volume fraction $Vf_{20}$ in a range of about 0.3 to 0.7 may be used with the present invention. Alternatively, a volume fraction $Vf_{20}$ of about 0.5 may be used. It should be understood that where more than one layer of materials (each layer having a particular dynamic shear modulus $G_x$) is used in the shear band, the volume fraction $Vf_x$ is the ratio of the total volume of materials in the shear band having a dynamic shear modulus of $G_x$ to the total volume of materials in the shear band. In other words, volume fraction is calculated based on the total volume of material present having a particular dynamic shear modulus relative to the total of volume of materials in the shear band and is not based on the volume fraction of a particular layer because multiple layers of materials may be present. Returning to Equation 3, the volume fractions for a shear band constructed from multiple layers of materials can be calculated using the following equation $$Vf_x = h_x/h \qquad (4)$$

Where:
$Vf_x$=the total volume fraction of materials having a particular dynamic shear modulus $G_x$
$h_x$=total height or thickness of all layers constructed from materials having a particular dynamic shear modulus $G_x$
h=overall thickness of all layers in the shear band.

Figure 6:
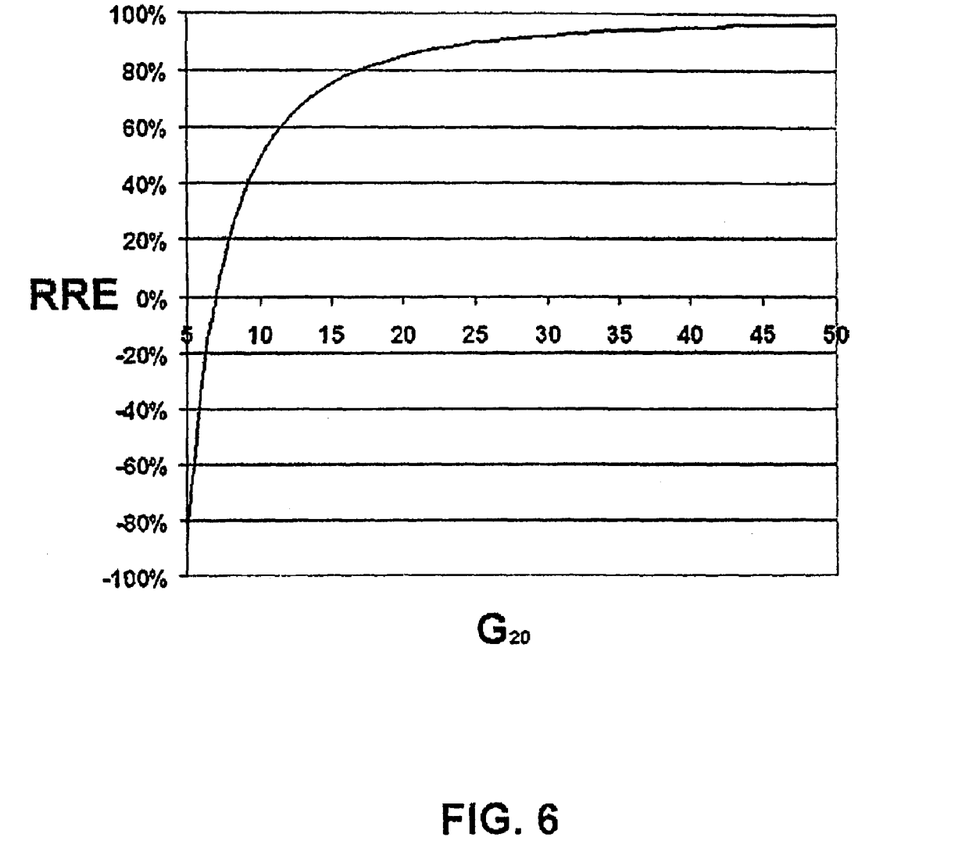

Applicants have also determined that increasing the dynamic shear modulus $G_{20}$ of the stiffer material that is used for layer 20 has a significant improvement on the rolling resistance RR of the overall composite shear band. Assuming a $G_{10}$ of 2.0 MPa and equal volume fractions $Vf_{10}$ and $Vf_{20}$, FIG. 6 provides a plot of Rolling Resistance Efficiency (RRE) versus $G_{20}$. Rolling Resistance Efficiency (RRE) is defined here as the actual increase in Rolling Resistance RR divided by the ideal increase in Rolling Resistance RR, with Rolling Resistance being calculated based on the contribution of the shear layers using the following:

$$RR = (G_{10})(Vf_{10})(\gamma_{10max})(\tan \delta_1) + (G_{20})(Vf_{20})(\gamma_{20max})(\tan \delta_2) \qquad (5)$$

Where:
RR=Rolling Resistance
$G_{10}$=dynamic shear modulus of the softer shear layer material, as measured by ASTM D5992.
$Vf_{10}$=volume fraction of soft material
$\gamma_{10max}$=maximum shear angle for the material of layer 10
$G_{20}$=dynamic shear modulus of the stiffer shear layer material, as measured by ASTM D5992.
$Vf_{20}$=volume fraction of stiffer material
$\gamma_{20max}$=maximum shear angle for the material of layer 20

While empirically the curve may not actually become a straight line as $G_{20}$ increases, FIG. 6 demonstrates that the effect of selecting layer 20 from a material that exhibits low hysteresis at the low strains experienced by layer 20 is that the rolling resistance RR contribution of the stiffer material becomes effectively zero as long as $G_{20}$ is sufficiently high relative to $G_{10}$.

Additional exemplary embodiments of the present invention in various non-pneumatic tire constructions will now be described. However, as will be understood by one of ordinary skill in the art using the teachings disclosed herein, it should be understood that the present invention is not limited to non-pneumatic tires and, instead, may be used with pneumatic tires as well as other technologies. Additionally, the following disclosure is for exemplary tire embodiments only; numerous other embodiments as well as methods of the invention fall with the scope of the present invention as set forth in the claims that follow.

Figure 7:
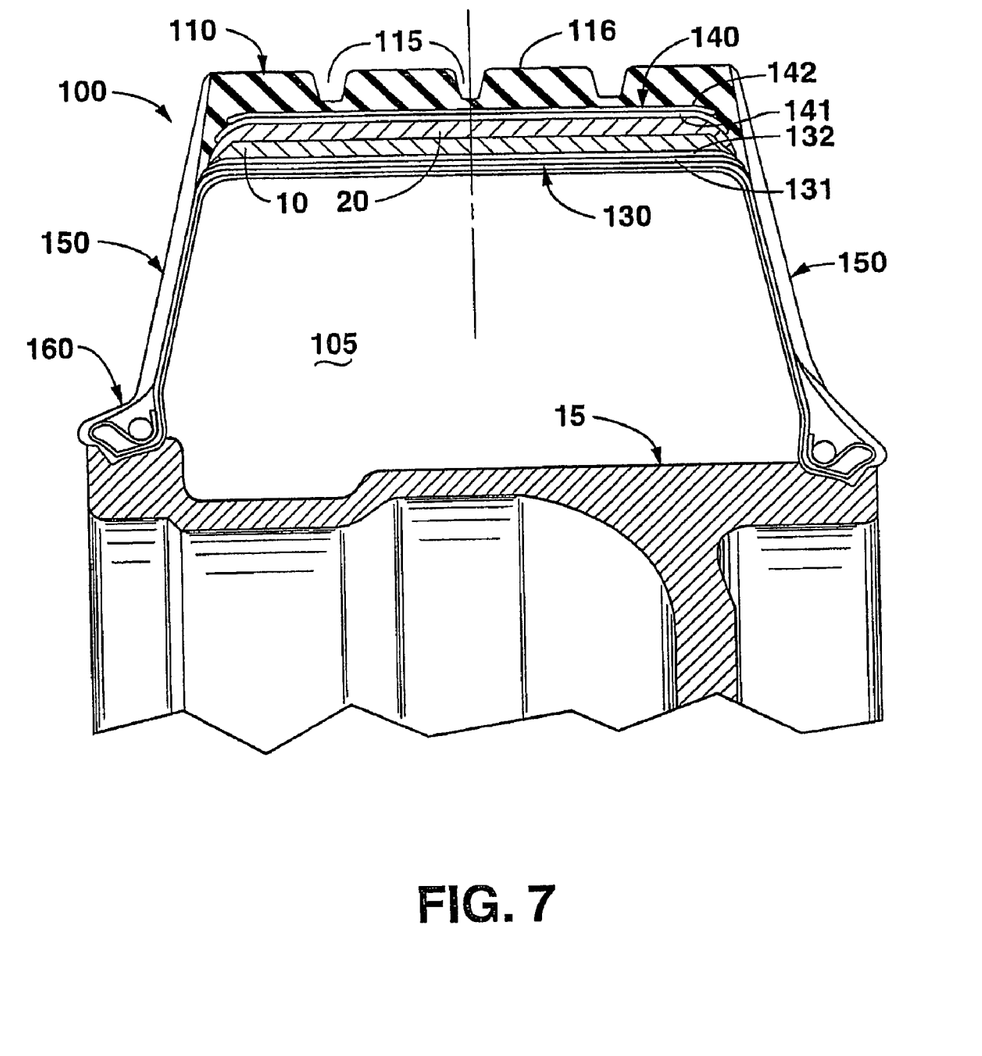
FIG. 7 is a cross section view of an exemplary embodiment of the present invention having a shear band as described herein.

Accordingly, by way of example, a structurally supported resilient tire in accordance with one exemplary embodiment of the present invention is shown in FIG. 7. The tire 100 shown in FIG. 7 has a ground contacting tread portion 110, sidewall portions 150 extending radially inward from the tread portion 110, and bead portions 160 at the end of the sidewall portions 150. The bead portions 160 anchor the tire 100 to a wheel 15. The tread portion 110, sidewall portions 150, and bead portions 160 define a hollow, annular space 105.

A reinforced annular band is disposed radially inward of tread portion 110. In the exemplary embodiment illustrated in FIG. 7, the annular band comprises a composite of shear layers 10 and 20 constructed as described above. Although only two layers 10 and 20 are shown, it should be understood that multiple layers may be used as previously described. The annular band further comprises a first membrane 130 having reinforced layers 131 and 132 that are adhered to the radially innermost extent of the shear layer 10, and a second membrane 140 having reinforced layers 141 and 142 that are adhered to the radially outermost extent of the shear layer 20.

The tread portion 110 may have no grooves or may have a plurality of longitudinally oriented tread grooves 115 forming essentially longitudinal tread ribs 116 therebetween. Ribs 116 may be further divided transversely or longitudinally to form a tread pattern adapted to the usage requirements of the particular vehicle application. Tread grooves 115 may have any depth consistent with the intended use of the tire. The second membrane 140 is offset radially inward from the bottom of the tread groove a sufficient distance to protect the structure of the second membrane from cuts and small penetrations of the tread portion. The offset distance is increased or decreased depending on the intended use of the tire. For example, a heavy truck tire would commonly use an offset distance of about 5 to 7 mm.

Each of the layers of the first 130 and second 140 membranes comprises essentially inextensible cord reinforcements embedded within an elastomeric coating. For a tire constructed of elastomeric materials, membranes 130 and 140 are adhered to shear layers 10 and 20 by the vulcanization of the materials. It is within the scope of the invention for membranes 130 and 140 to be adhered to shear layer 120 by any suitable method of chemical or adhesive bonding or mechanical fixation. Each of the shear layers 10 and 20 may be constructed from a variety of materials. By way of example, such materials may include rubber, polyurethane, and thermoplastic elastomers. The materials may be adhered to each other by any suitable method of bonding or mechanical fixation.

The reinforcing elements of layers 131-132 and 141-142 may be any of several materials suitable for use as tire belt reinforcements in conventional tires such as monofilaments or cords of steel, aramid or other high modulus textiles. For the illustrative tires described herein, the reinforcements are steel cords of four wires of 0.28 mm diameter (4×0.28). Although the variations of the invention disclosed herein have cord reinforced layers for each of the membranes, any suitable material may be employed for the membranes which meets the requirements for the tensile stiffness, bending stiffness, and compressive buckling resistance properties required of the annular band. That is to say, the membrane structure may be any of several alternatives such as a homogeneous material, a fiber reinforced matrix, or a layer having discrete reinforcing elements.

In the first membrane 130, layers 131 and 132 have essentially parallel cords oriented at an angle a relative to the tire equatorial plane, and the cords of the respective layers have an opposite orientation. That is, an angle +α in layer 131 and an angle −α in layer 132. Similarly for the second membrane 140, layers 141 and 142 have essentially parallel cords oriented at angles +β and −β, respectively, to the equatorial plane. In these cases, the included angle of the cords between adjacent layers will be twice the specified angle, α or β. Angles α and β will typically be in the range of about 10° to about 45°, or more preferably in the range of about 20° to about 35°, or still more preferably in the range of about 25° to about 30°. It is not required, however, for the cords of the layer pairs in a membrane to be oriented at mutually equal and opposite angles. For example, it may be desirable for the cords of the layer pairs to be asymmetric relative to the tire equatorial plane.

The cords of each of the layers 131, 132 and 141, 142 are embedded in an elastomeric coating layer typically having a dynamic shear modulus of about 20 MPa. It is preferred that the dynamic shear modulus of the coating layers be greater than the overall dynamic shear modulus $G_{eff}$ of the composite of shear layers 10 and 20 (further discussed below) to ensure that deformation of the annular band is primarily by shear deformation within the combined shear layers 10 and 20.

The relationship between the overall dynamic shear modulus $G_{eff}$ of the composite of shear layers 10 and 20 and the effective longitudinal tensile modulus $E'_{MEMBRANE}$ of the membranes 130 and 140 controls the deformation of the annular band under an applied load. The effective tensile modulus $E'_{MEMBRANE}$ of the membrane using conventional tire belt materials can be estimated by the following:

$$E'_{MEMBRANE} = (2D+t)\frac{E_{RUBBER}}{2(1-v^2)}\left[\left(\frac{P}{P-D}\right)\frac{2-(1+v)\text{SIN}^2(2\alpha)}{\text{SIN}^4\alpha} + \left(\frac{t}{D}\right)\frac{1}{\text{TAN}^2\alpha}\left(\frac{1}{\text{TAN}^2\alpha}-v\right)\right] \qquad (6)$$

Where:
$E_{RUBBER}$=tensile modulus of the coating material
P=cord pace (cord centerline spacing) measured perpendicular to the cord direction
D=cord diameter
v=Poisson's ratio for the coating material
α=Cord angle with respect to the equatorial plane
t=Rubber thickness between cables in adjacent layers
Note that $E'_{MEMBRANE}$ is the elastic modulus of the membrane times the effective thickness of the membrane. When the ratio $E'_{MEMBRANE}/G_{eff}$ is relatively low, deformation of the annular band under load approximates that of the homogeneous band and produces a non-uniform ground contact pressure. On the other hand, when the ratio $E'_{MEMBRANE}/G_{eff}$ is sufficiently high, deformation of the annular band under load is essentially by shear deformation of the composite of shear layers 10 and 20 with little longitudinal extension or compression of the membranes. Accordingly, ground contact pressure is substantially uniform.

The ratio of the longitudinal tensile modulus of the membrane, $E'_{MEMBRANE}$, to the overall dynamic shear modulus $G_{eff}$ of the composite of shear layers 10 and 20 is at least about 100:1, and preferably at least about 1000:1. For membranes comprising cord reinforced layers using the 4×0.28 cords and the angles disclosed herein, the desired overall dynamic shear modulus $G_{eff}$ of the composite of shear layers 10 and 20 is about 3 MPa to about 20 MPa. Repeated deformation of the composite of shear layers 10 and 20 during rolling under load causes energy dissipation due to the hysteretic nature of the materials used. The overall heat buildup in the tire is a function of both this energy dissipation and the thickness of the shear layer. Thus, for a given tire design using conventional materials, the hysteresis of the shear layer 10 and 20 should be specified to maintain tire operating temperatures below about 130° C. for tires in continuous use.

According to another exemplary embodiment of the present invention, the cords of at least one layer of the membranes can be at or near 0° to the equatorial plane for increased tensile stiffness of the membranes 130 and 140. For such embodiment, the cords of each of the layers 131, 132 and 141, 142 are embedded in an elastomeric coating layer typically having a dynamic shear modulus of about 3 to 20 MPa. In such case, it is preferred that the dynamic shear modulus of the coating layers be substantially equal to the overall dynamic shear modulus of the shear layers 10 and 20 to insure that deformation of the annular band is primarily by shear deformation within the shear band comprised of shear layers 10 and 20.

For a membrane in which the reinforcing cords are oriented at less than 10° to the equatorial plane, the following can be used to estimate the tensile modulus of the membrane:

$$E'_{MEMBRANE} = E_{CORD} * V * t_{MEMBRANE} \qquad (7)$$

Where:
$E_{CORD}$=tensile modulus of the cord
V=volume fraction of the cable in the membrane
$t_{MEMBRANE}$=thickness of the membrane
For membranes comprising a homogeneous material or a fiber or other material reinforced matrix, the modulus is the tensile modulus of the material or matrix.

Figure 8:
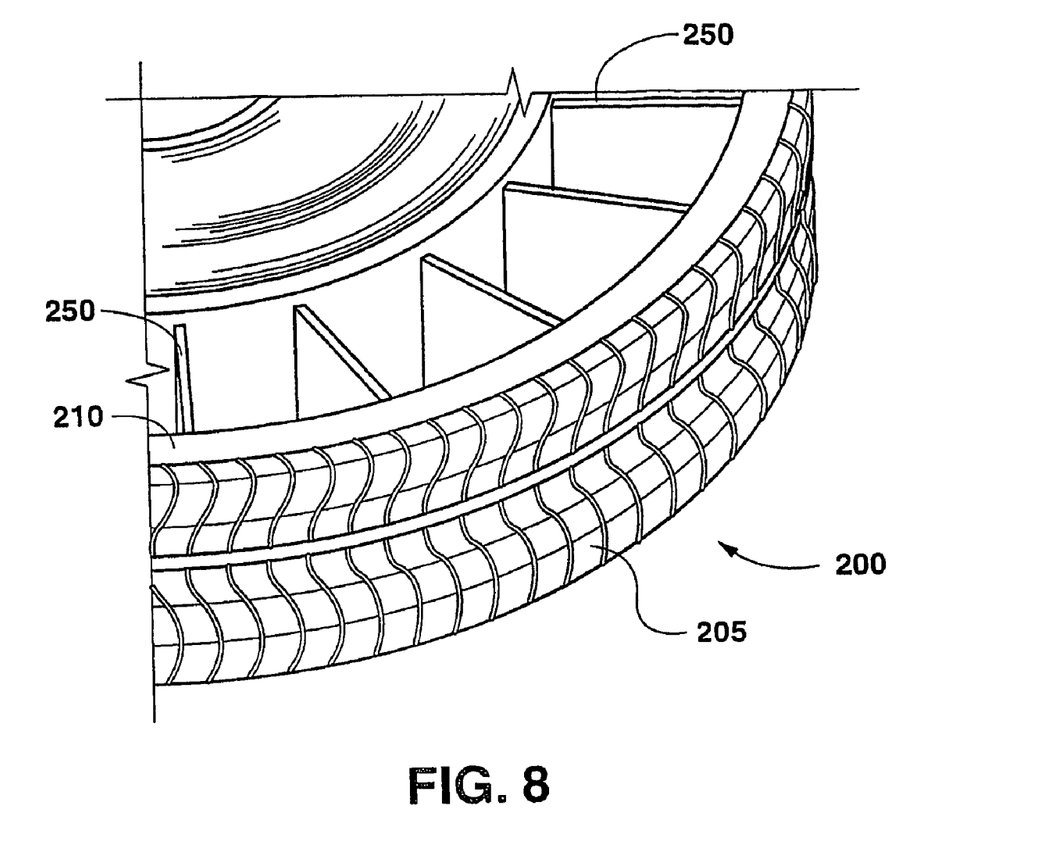
FIG. 8 is a partial perspective view of an exemplary embodiment of the present invention having a shear band as described herein.
Figure 9:
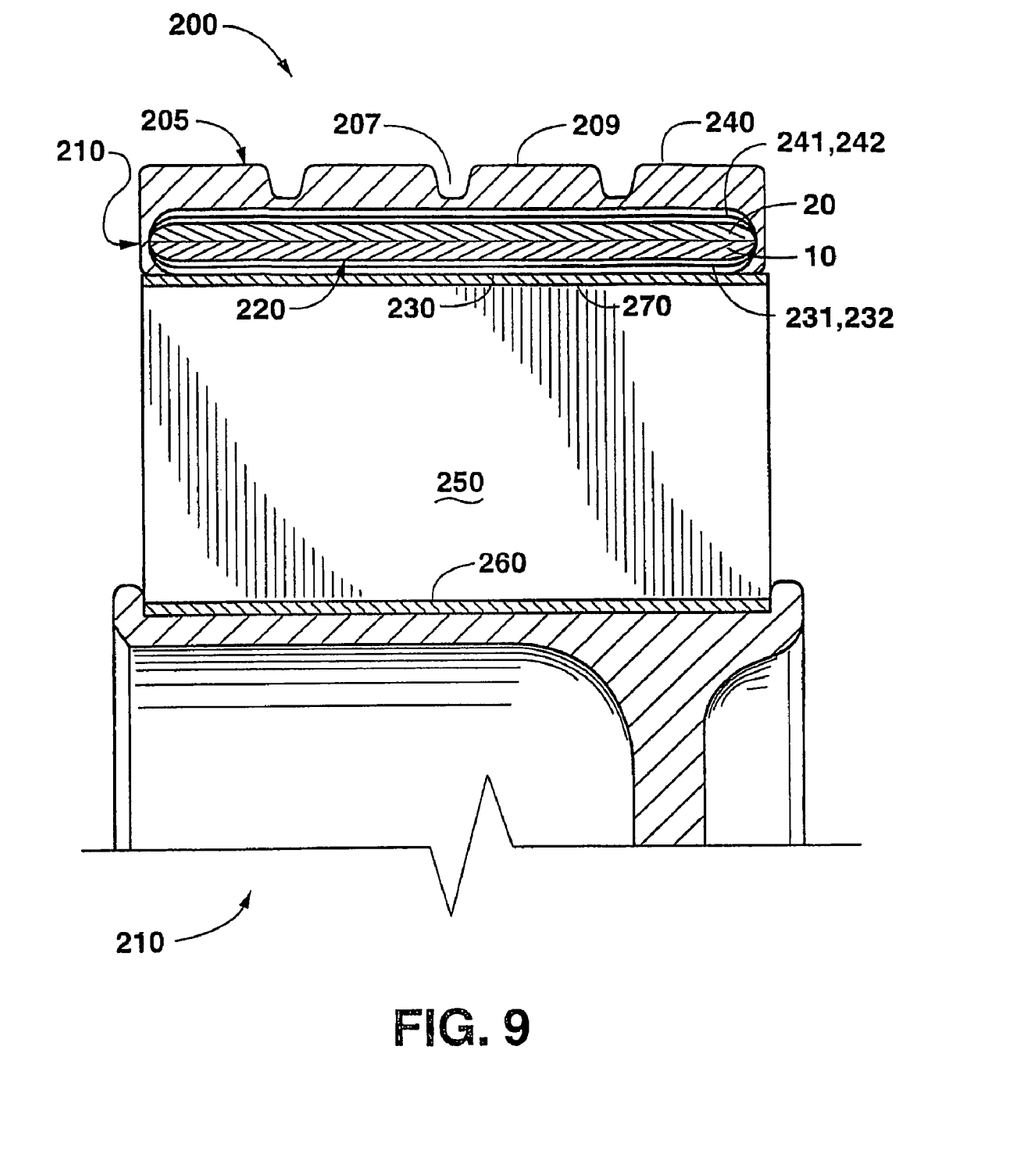
FIG. 9 is a cross section view of the exemplary embodiment of the present invention illustrated in FIG. 8. A cross section of an exemplary shear band is illustrated.

By way of a further explanation, FIGS. 8 and 9 depict yet another exemplary embodiment of the present invention in a non-pneumatic tire. The tire 200 shown in FIG. 8 has a ground contacting tread portion 205, a reinforced annular band 210 disposed radially inward of the tread portion, a plurality of web spokes 250 extending transversely across and radially inward from the annular band, and a mounting band 260 at the radially inner end of the web spokes 250. The mounting band 260 anchors the tire 200 to a wheel 210 or hub. As used herein "extending transversely" means that the web spokes 250 may be axially aligned, or may be oblique to the tire axis. Further, "extending radially inward" means that the web spokes 250 may lie in a plane radial to the tire axis or may be oblique to the radial plane. In addition, a second plurality of web spokes may extend in the equatorial plane.

Referring to FIG. 9, which shows the tire 200 and wheel 210 in section view in the meridian plane, the reinforced annular band 210 comprises elastomeric shear layers 10 and 20 constructed as described above. A first membrane 230 is adhered to the radially innermost extent of the elastomeric shear layer 10, and a second membrane 240 is adhered to the radially outermost extent of the elastomeric shear layer 20. The membranes 130 and 140 have a tensile stiffness that is greater than the shear stiffness of the shear layer 120 so that the reinforced annular band 110 undergoes shear deformation under load. As with other exemplary embodiments described herein, the reinforced annular band may comprise shear layer that includes multiple layers 10 and 20 rather than only one of each.

It should be understood that the present invention includes various modifications that can be made to the exemplary embodiments of apparatus and method described herein that come within the scope of the appended claims and their equivalents.

What is claimed is:

1. A shear band defining a radial direction, the shear band comprising:
   a composite shear layer having an overall dynamic shear modulus, said composite shear layer comprising at least (i) one or more layers having a first dynamic shear modulus and a first total volume fraction, (ii) one or more layers having a second dynamic shear modulus and a second total volume fraction, wherein the ratio of the second dynamic shear modulus to the first dynamic shear modulus is at least about 3, and wherein said one or more layers having a first or second dynamic shear modulus are arranged in an alternating manner between layers having the first dynamic shear modulus and layers having the second dynamic shear modulus;
   at least a first membrane adhered to a radially inward extent of said composite shear layer; and
   at least a second membrane adhered to a radially outward extent of said composite shear layer;
   wherein a ratio of the longitudinal tensile modulus of one of said membranes to the overall dynamic shear modulus of said composite shear layer is at least about 100:1.

2. A shear band according to claim 1, wherein said one or more layers having a first dynamic shear modulus comprises at least one material having a hysteresis of less than about 0.2 at strains between about 15 percent and about 30 percent.

3. A shear band according to claim 1, wherein said one or more layers having a first dynamic shear modulus comprises at least one material having a hysteresis of less than about 0.1 at strains between about 15 percent and about 30 percent.

4. A shear band according to claim 3, wherein said one or more layers having a second dynamic shear modulus comprises at least one material having a hysteresis of less than about 0.07 at strains between about 0.1 percent and about 2 percent.

5. A shear band according to claim 3, wherein said one or more layers having a second dynamic shear modulus comprises at least one material having a hysteresis of less than about 0.04 at strains between about 0.1 percent and about 2 percent.

6. A tire having a ground contacting portion and a tread portion, the tire comprising a shear band defining a radial direction, the shear band comprising:
   a composite shear layer having an overall dynamic shear modulus, said composite shear layer comprising at least (i) one or more layers having a first dynamic shear modulus and a first total volume fraction, (ii) one or more layers having a second dynamic shear modulus and a second total volume fraction, wherein the ratio of the second dynamic shear modulus to the first dynamic shear modulus is at least about 3, and wherein said one or more layers having a first or second dynamic shear modulus are arranged in an alternating manner between layers having the first dynamic shear modulus and layers having the second dynamic shear modulus;
   at least a first membrane adhered to a radially inward extent of said composite shear layer; and
   at least a second membrane adhered to a radially outward extent of said composite shear layer;
   wherein a ratio of the longitudinal tensile modulus of one of said membranes to the overall dynamic shear modulus of said composite shear layer is at least about 100:1,
   wherein said one or more layers having a first dynamic shear modulus comprises at least one material having a hysteresis of less than about 0.1 at strains between about 15 percent and about 30 percent, and
   wherein said one or more layers having a second dynamic shear modulus comprises at least one material having a hysteresis of less than about 0.04 at strains between about 0.1 percent and about 2 percent.

7. A tire for placement on a wheel, the tire defining a radial direction, comprising:
   a ground contacting tread portion;
   a reinforced annular band disposed radially inward of said tread portion, wherein said reinforced annular band comprises a composite shear layer having an overall dynamic shear modulus, said composite shear layer comprising:
      (i) one or more layers constructed from materials having a first dynamic shear modulus and a first total volume fraction; and
      (ii) one or more layers constructed from materials having a second dynamic shear modulus and a second total volume fraction;
      wherein the ratio of the second dynamic shear modulus to the first dynamic shear modulus is at least about 3, and wherein said one or more layers of materials having either the first or second dynamic shear modulus are arranged in an alternating manner between the first dynamic shear modulus and the second dynamic shear modulus along the radial direction of the tire;
   a support structure for mounting said band and said tread portion to the wheel, said support structure being located radially inward of said reinforced annular band;
   at least a first membrane adhered to the radially inward extent of said composite shear layer; and
   at least a second membrane adhered to the radially outward extent of said composite shear layer;
   wherein a ratio of the longitudinal tensile modulus of one of said membranes to the overall dynamic shear modulus of said composite shear layer is at least about 100:1.

8. A tire according to claim 7, wherein the second total volume fraction is in the range of about 0.3 to about 0.7.

9. A tire according to claim 7, wherein the second total volume fraction is about 0.5.

10. A tire according to claim 7, wherein the ratio of the longitudinal tensile modulus of one of said membranes to the overall dynamic shear modulus of said composite shear layer is at least about 500:1.

11. A tire according to claim 7, wherein the ratio of the longitudinal tensile modulus of one of said membranes to the overall dynamic shear modulus of said composite shear layer is at least about 1000:1.

12. A tire according to claim 7, wherein the first dynamic shear modulus is greater than about 1.5 MPa but less than about 5 MPa.

13. A tire according to claim 7, wherein the first dynamic modulus is greater than about 2 MPa but less than about 4 MPa.

14. A tire according to claim 7, wherein the Elongation at Break at 100° C. is greater than about 100 percent for said one or more layers constructed from materials having a first dynamic shear modulus.

15. A tire according to claim 7, wherein the Elongation at Break at 100° C. is greater than about 180 percent for said one or more layers constructed from materials having a first dynamic shear modulus.

16. A tire according to claim 7, wherein each of said at least first and second membranes further comprise layers of substantially inextensible cord reinforcements embedded in a coating layer having a shear modulus of elasticity greater than or equal to at least the overall dynamic shear modulus of said composite shear layer.

17. A tire for placing on a wheel, comprising
a ground contacting tread portion;
a reinforced annular band disposed radially inward of said tread portion, wherein said band comprises a composite shear layer having an overall dynamic shear modulus, said composite shear layer comprising i) a first shear layer having a first dynamic shear modulus, ii) a second shear layer disposed radially outward of said first shear layer, said second shear layer having a second dynamic shear modulus, wherein the ratio of the second dynamic shear modulus to the first dynamic shear modulus is at least about 3;
a support structure for mounting said reinforced annular band and said tread portion to the wheel, said support structure being located radially inward of said reinforced annular band;
at least a first membrane adhered to the radially inward extent of said composite shear layer; and
at least a second membrane adhered to the radially outward extent of said composite shear layer;
wherein a ratio of the longitudinal tensile modulus of one of said membranes to the overall dynamic shear modulus of said composite shear layer is at least about 100:1.

18. A tire according to claim 17, wherein said second material has a total volume fraction in the range of about 0.3 to about 0.7.

19. A tire according to claim 17, wherein said second material has a total volume fraction of about 0.5.

20. A tire according to claim 19, wherein the ratio of the longitudinal tensile modulus of one of said membranes to the overall dynamic shear modulus of said composite shear layer is at least about 500:1.

21. A tire according to claim 19, wherein the ratio of the longitudinal tensile modulus of one of said membranes to the overall dynamic shear modulus of said composite shear layer is at least about 1000:1.

22. A tire according to claim 17, wherein the first dynamic shear modulus is greater than about 1.5 MPa but less than about 5 MPa.

23. A tire according to claim 17, wherein the first dynamic shear modulus is greater than about 2 MPa but less than about 4 MPa.

24. A tire according to claim 17, wherein the Elongation at Break at 100° C. for the first shear layer is greater than about 100 percent.

25. A tire according to claim 17, wherein the Elongation at Break at 100° C. for the first shear layer is greater than about 180 percent.

26. A tire according to claim 17, wherein each of said at least first and second membranes further comprise layers of substantially inextensible cord reinforcements embedded in an elastomeric coating layer having a shear modulus of elasticity greater than or equal to at least the overall dynamic shear modulus of said first and second shear layers.

27. A tire according to claim 17, wherein the first shear layer comprises at least one material having a hysteresis of less than about 0.2 at strains between about 15 percent and about 30 percent.

28. A tire according to claim 17, wherein the first shear layer comprises at least one material having a hysteresis of less than about 0.1 at strains between about 15 percent and about 30 percent.

29. A tire according to claim 17, wherein the second shear layer comprises at least one material having a hysteresis of less than about 0.07 at strains between about 0.1 percent and about 2 percent.

30. A tire according to claim 17, wherein the second shear layer comprises at least one material having a hysteresis of less than about 0.04 at strains between about 0.1 percent and about 2 percent.

* * * * *